(12) United States Patent
Li et al.

(10) Patent No.: US 9,811,448 B2
(45) Date of Patent: Nov. 7, 2017

(54) EVENT-DRIVEN SOFTWARE TESTING

(71) Applicant: FUJITSU LIMITED, Kawasaki-shi, Kanagawa (JP)

(72) Inventors: Peng Li, Milpitas, CA (US); Hideo Tanida, Kawasaki (JP); Huaxin Pang, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/975,408

(22) Filed: Dec. 18, 2015

(65) Prior Publication Data
US 2017/0177465 A1   Jun. 22, 2017

(51) Int. Cl.
G06F 9/44 (2006.01)
G06F 11/36 (2006.01)

(52) U.S. Cl.
CPC ............... *G06F 11/3684* (2013.01)

(58) Field of Classification Search
None
See application file for complete search history.

(56) References Cited

U.S. PATENT DOCUMENTS

| | | | | |
|---|---|---|---|---|
| 5,570,108 A * | 10/1996 | McLaughlin | ....... | G06F 3/04842 345/904 |
| 5,600,789 A * | 2/1997 | Parker | ................. | G06F 11/3688 714/38.11 |
| 5,983,001 A * | 11/1999 | Boughner | ........... | G06F 9/45512 714/38.1 |
| 6,002,395 A * | 12/1999 | Wagner | ................. | G06F 9/4443 345/173 |
| 6,184,880 B1 * | 2/2001 | Okada | ................. | G06F 9/45512 714/E11.217 |
| 8,682,083 B2 * | 3/2014 | Kumar | ................. | G06K 9/6202 382/218 |
| 8,826,084 B1 * | 9/2014 | Gauf | ................... | G06F 11/3684 714/32 |
| 8,924,938 B2 * | 12/2014 | Chang | ................. | G06F 11/3688 717/126 |

(Continued)

OTHER PUBLICATIONS

Saxena, Prateek, et al. "A symbolic execution framework for javascript." 2010 IEEE Symposium on Security and Privacy. IEEE, 2010.*

(Continued)

*Primary Examiner* — Matthew Brophy
(74) *Attorney, Agent, or Firm* — Maschoff Brennan

(57) ABSTRACT

A computer implemented method of software testing may include obtaining multiple interactive elements from an event-driven software application. The interactive elements may be configured to be selected by a user and when selected result in an event in the event-driven software application. The method may also include determining which of the interactive elements may be user interactive in a first state of the event-driven software application. In some embodiments, determining which of the interactive elements may be user interactive may include obtaining one or more coordinates of a first interactive element and determining if the first interactive element is a top layer interactive element at any one of the one or more coordinates. The method may further include testing the event-driven software application based on the user interactive elements.

20 Claims, 7 Drawing Sheets

(56) References Cited

U.S. PATENT DOCUMENTS

| | | | |
|---|---|---|---|
| 9,152,543 B1 | 10/2015 | Li et al. | |
| 9,619,375 B2* | 4/2017 | Avgerinos | G06F 11/3688 |
| 2006/0005079 A1* | 1/2006 | Kaplan | G06F 11/3692 |
| | | | 714/38.1 |
| 2007/0143678 A1* | 6/2007 | Feigenbaum | G06F 11/3414 |
| | | | 715/704 |
| 2008/0294985 A1* | 11/2008 | Milov | G06F 11/3664 |
| | | | 715/704 |
| 2009/0196497 A1* | 8/2009 | Pankratius | G06F 17/3089 |
| | | | 382/165 |
| 2009/0271386 A1* | 10/2009 | Milov | G06F 11/3692 |
| 2010/0083233 A1* | 4/2010 | Vanoverberghe | G06F 11/3612 |
| | | | 717/126 |
| 2011/0185321 A1* | 7/2011 | Capela | G06F 3/0488 |
| | | | 715/863 |
| 2012/0179935 A1* | 7/2012 | Wang | G06F 11/3676 |
| | | | 714/32 |
| 2013/0019171 A1* | 1/2013 | Mounty | G06F 11/3688 |
| | | | 715/704 |
| 2013/0080470 A1 | 3/2013 | Stergiou et al. | |
| 2013/0290875 A1* | 10/2013 | Dixit | G06F 11/3664 |
| | | | 715/760 |
| 2014/0143762 A1 | 5/2014 | Li et al. | |
| 2015/0067498 A1* | 3/2015 | Satou | G06F 11/3672 |
| | | | 715/704 |
| 2015/0081598 A1* | 3/2015 | Depizzol | G06N 99/005 |
| | | | 706/12 |
| 2015/0269061 A1* | 9/2015 | Li | G06F 11/3684 |
| | | | 717/131 |
| 2015/0331787 A1* | 11/2015 | Wiggers | G06F 11/3676 |
| | | | 717/124 |
| 2015/0339217 A1* | 11/2015 | Avgerinos | G06F 11/3608 |
| | | | 717/132 |
| 2017/0010956 A1* | 1/2017 | Chen | G06F 11/36 |

OTHER PUBLICATIONS

Ganov, Svetoslav, et al. "Barad-a GUI testing framework based on symbolic execution." Laboratory of Experimental Software Engineering, University of Texas at Austin Software Testing and Verification Group [online][retrieved May 8, 2017] http://users.ece.utexas.edu/~perry/work/papers/080521-SG-barad.pdf (2009).*

Yang, Wei, Mukul R. Prasad, and Tao Xie. "A grey-box approach for automated GUI-model generation of mobile applications." International Conference on Fundamental Approaches to Software Engineering. Springer Berlin Heidelberg, 2013.*

Ganov, Svetoslav, et al. "Event listener analysis and symbolic execution for testing GUI applications." International Conference on Formal Engineering Methods. Springer Berlin Heidelberg, 2009.*

Mirzaei, Nariman, et al. "Testing android apps through symbolic execution." ACM SIGSOFT Software Engineering Notes 37.6 (2012): 1-5.*

• Ganov, Svetoslav R., et al. "Test generation for graphical user interfaces based on symbolic execution." Proceedings of the 3rd international workshop on Automation of software test. ACM, 2008.*

U.S. Appl. No. 14/546,956, filed Nov. 18, 2014.

Guodong Li, Esben Andreasen and Indradeep Ghosh. "SymJS: Automatic Symbolic Testing of Javascript Web Applications", FSE 2014, Nov. 16, 2014.

Hongki Lee, Sooncheol Won, Joonho Jin and Junhee Cho and Sukyoung Ryu. "SAFE: Formal Specification and Implementation of a Scalable Analysis Framework for ECMA script", FOOL 2012, Oct. 22, 2012.

SungGyeong Bae, Hyunghun Cho, Inho Lim and Sukyoung Ryu. "SAFE WAPI : WEB API Misuse Detector for Web Applications", ACM FSE '14, Nov. 16, 2014.

HtmlUnit, Maven, Version 2.19, Nov. 12, 2015. Retrieved from <http://htmlunit.sourceforge.neti>.

SeleniumHQ; Browser Automation, retrieved on Dec. 17, 2015. Retrieved from <http://www.seleniumhq.org/>.

The WebKit Open Source Project; Open Source Web Browser Engine, Apple Inc., retrieved on Dec. 17, 2015. Retrieved from <https://www.webkit.org/>.

* cited by examiner

EVENT-DRIVEN SOFTWARE TESTING

FIELD

The embodiments discussed herein are related to testing of event-driven software.

BACKGROUND

Testing software, such as validating or verifying software, is a common activity among information technology (IT) organizations. For example, whether the software is a desktop application for execution at one or more client computer systems, mobile device application for execution on a mobile device, or a Web application for execution at one or more server computer systems, it is often important to verify the quality of the software. While some types of errors in software cause only annoyance or inconvenience to users, other types of errors have the potential to cause other problems, such as data and financial loss.

One type of software that is becoming more ubiquitous is event-driven software such as graphical user interface (GUI) based applications and Web based applications. In event-driven software, the flow of the software may be determined by events such as user actions (mouse clicks, key presses), sensor outputs, or messages from other programs/threads. Event-driven software may have a large number of different events and corresponding event sequences that may be explored during testing. Often, a large number of events and event sequences may create an event sequence explosion. The event sequence explosion may result in the testing of the event-driven software being time consuming and/or resource intensive. In some instances, the amount of processing required from an event sequence explosion may be prohibitive in performing the testing.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a computer implemented method of software testing may include obtaining multiple interactive elements from an event-driven software application. The interactive elements may be configured to be selected by a user and when selected result in an event in the event-driven software application. The method may also include determining which of the interactive elements may be user interactive in a first state of the event-driven software application. In some embodiments, determining which of the interactive elements may be user interactive may include obtaining one or more coordinates of a first interactive element and determining if the first interactive element is a top layer interactive element at any one of the one or more coordinates. The method may further include testing the event-driven software application based on the user interactive elements.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and systems of testing event-driven software applications, such as graphical user interface (GUI) based applications for electronic devices and Web based applications. The flow of event-driven software applications may be determined by different human interactions with different interactive elements presented to a user that result in "events" in the software. Event-driven software applications may have a large number of different events and corresponding event sequences that may be explored during testing, which may lead to an event sequence explosion problem when analyzing the event-driven software applications.

As detailed below, a given state of an event-driven software application may include a set of machine visible interactive elements. A portion of the machine visible interactive elements may include user interactive elements. The methods and systems described in this disclosure may be configured to determine the interactive elements in a given state of an event-driven software application that are user interactive. By identifying the user interactive elements, event sequences may be constructed using only the user interactive elements to test the event-driven software application. By constructing event sequences that include only user interactive elements, the number of event sequences produced may be reduced, thereby reducing the processing time, resources, complexity, and/or other aspects of testing the event-driven software application.

In some embodiments, the interactive elements in a given state of an event-driven software application may be determined to be user interactive based on structural attributes, e.g., coding nomenclature, of the interactive elements and topological attributes, e.g., the position of presentation to a user of the interactive elements. For example, interactive elements that include structural attributes that indicate that they are displayed and may receive user input and that include a topmost position among the interactive elements presented in a display may be determined to be user interactive elements for a given state.

Embodiments of the present disclosure are explained with reference to the accompanying drawings.

Figure 1:
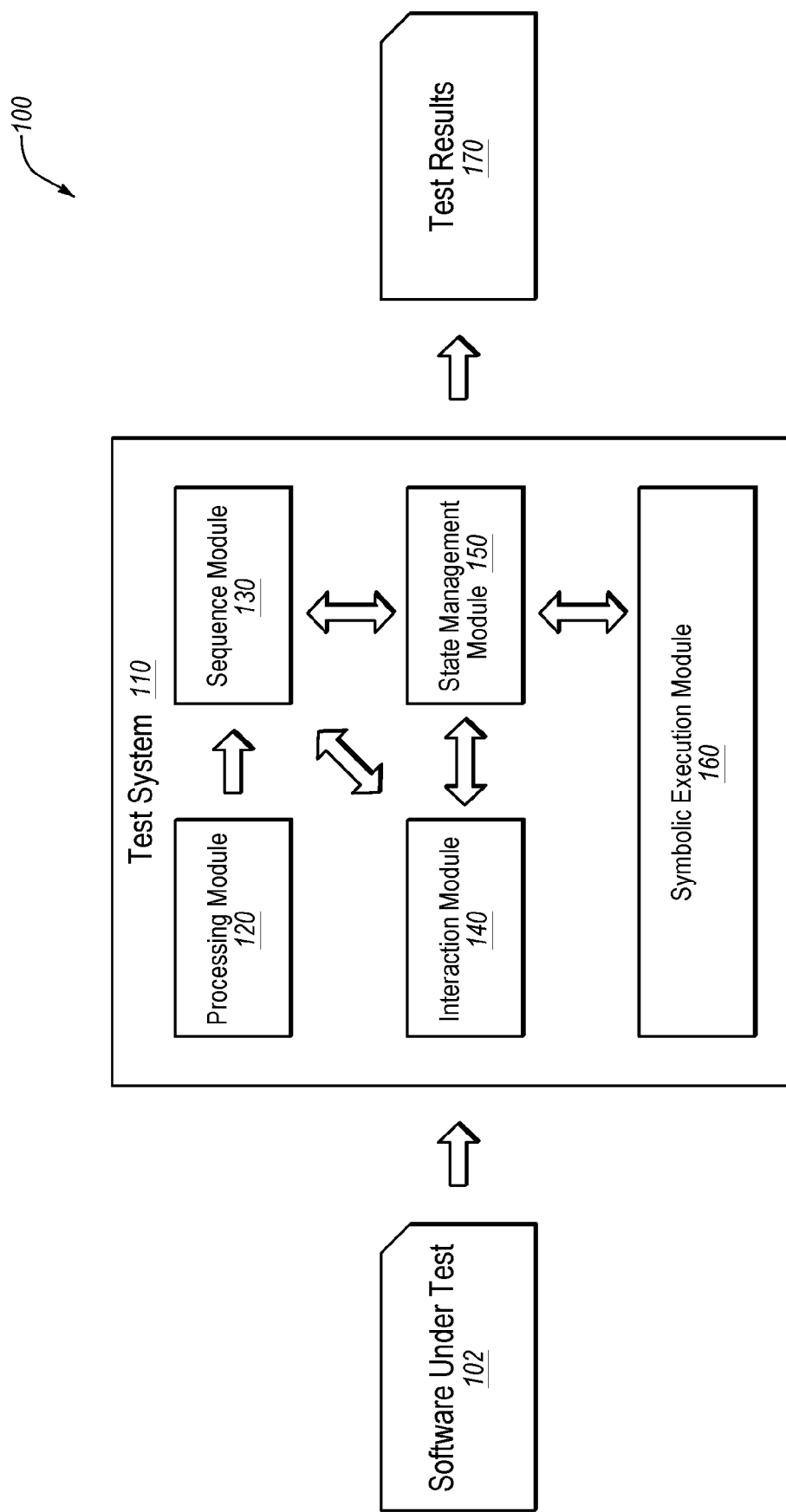
FIG. 1 is a diagram representing an example system configured to test software.

FIG. 1 is a diagram representing an example system 100 configured to test software, arranged in accordance with at least one embodiment described herein. The system 100 may include a test system 110 configured to perform testing with respect to software under test 102 of an event-driven software application to generate test results 170 of the event-driven software application. The software under test 102 may include electronic data, such as, for example, the event-driven software application, code of the event-driven software application, libraries, applications, scripts, or other logic or instructions for execution by a processing device. In some embodiments, the software under test 102 may include a complete instance of the event-driven software application. Additionally or alternatively, the software under test 102 may include a portion of the event-driven software application. The software under test 102 may be written in any suitable type of computer language that may be used for event-driven software applications.

As detailed below, the test system 110 may be configured to perform a series of operations with respect to the software under test 102 that may help with exploring and testing the software under test 102. As illustrated, the test system 110 may include a processing module 120, a sequence module 130, an interaction module 140, a state management module 150, and a symbolic execution module 160.

The processing module 120 may be configured to obtain the software under test 102. For example, the software under test 102 may be HTML code for a website. In these and other embodiments, the processing module 120 may request the html code for the website using a web address of the website.

After obtaining the software under test 102, the processing module 120 may parse the software under test 102 and store the parsed software under test 102 in a format conducive to the test system 110. In these and other embodiments, the processing module 120 may identify interactive elements within the software under test 102. In these and other embodiments, the processing module 120 may identify the interactive elements based on properties of the interactive elements. For example, an interactive element may be defined within the software under test 102 based on coding nomenclatures that indicate that an element is interactive. Alternately or additionally, the processing module 120 may determine if an element is interactive based on accessing other information about the software under test 102. For example, if the software under test 102 is HTML from a webpage, the processing module 120 may determine that an element is interactive based on the document object model (DOM) attribute of the element. In some embodiments, the processing module 120 may be a head-less web browser and a JavaScript interpreter. Alternately or additionally, the processing module 120 may be some other software.

Generally, interactive elements may be any elements that are presented to a user and configured to be interacted with by a user. For example, the interactive elements may be buttons, labels, links, fields, or graphics, among other graphic user interface elements that allow a user to interact with the software under test 102. In some embodiments, a user interaction with an interactive element may result in an event in the software under test 102. An event in the software under test 102 may be any change in the software under test 102. For example, a user interaction with an interactive element may result in a change in a variable in the software under test 102. Alternately or additionally, an event may change what is presented to a user by the software under test 102. For example, an event may result in a new display being presented to a user that is different than a previous display and does not include the characteristics of the previous display. Alternately or additionally, an event may result in a change to the current display being presented to the user. For example, checking a box may activate an interactive element that was previously not user interactive.

In some embodiments, an occurrence of an event in the software under test 102 may result in a new state of the software under test 102. Each state of the software under test 102 may include one or more interactive elements that when interacted with cause an event that may result in the software under test 102 changing to a different state. Note that the same interactive element may be available for interaction by a user in multiple states of the software under test 102. In some embodiments, states of the software under test 102 may be accessed based on user interactions with interactive elements in previous states. Thus, a state may be accessed in the software under test 102 based on a sequence of events.

An example of states, events, and interactive elements is now provided for software for online purchases. A first state of the software may include multiple interactive elements, such as a clear-cart button and multiple add-to-cart buttons associated with different products. Each one of these interactive elements may be interacted with by a user. For example, a user may select an add-to-cart button for a displayed product. As a result, the price field may change to indicate a price of items in the cart and the example software may enter a second state. In the second state, a purchase button may be presented by the software along with the clear-cart button and the multiple add-to-cart buttons. In the second state, the user may select the purchase button. Selection of the purchase button may cause software to enter a third state. In the third state a purchase display with payment fields may be provided. The purchase display may cover the add-to-cart buttons such that they are no longer user interactive.

Testing of the software under test 102 by the test system 110 may include determining possible sequences of events and testing each sequence of events for errors or other complications in the software under test 102. The sequence module 130 may be configured to determine events that may occur within a given state and to generate the different event sequences accordingly. For example, a given state may include a sequence of events A, B, and C to reach that state. Within the state, the processing module 120 may indicate that there are three different events, D, E, and F that may occur based on interactive elements D*, E*, and F*.

Before determining the event sequences based on the given state and the different events associated with that state, the sequence module 130 may obtain all elements that the processing module 120 indicates are interactive within the given state. The elements determined by the processing module 120 to be interactive in the given state may be referred to as machine interactive elements. The sequence module 130 may provide the machine interactive elements to the interaction module 140.

Note that because the processing module 120 determines an element to be an interactive element in a given state does not mean that the interactive element is user interactive. For example, the processing module 120 may indicate that an element is interactive in a given state but when the software under test 102 is implemented the element may not be user interactive in the given state. For example, in the example described previously with respect to the software for online purchases, the processing module 120 may indicate that in the third state with the purchase display that the add-to-cart buttons are interactive. However, in actual implementation of the example software for online purchases the purchase display may cover the add-to-cart buttons such that a user could not interact with the add-to-cart buttons during the third state. In short, relying wholly on coding nomenclature of an element or a listed attribute of an element may not correctly indicate that an element is user interactive in a given state. The coding nomenclature of an element or a listed attribute of an interactive element may indicate that an element may be interactive in a given state of the software under test 102, but may not indicate that in a given state that the interactive element is a user interactive element for that given state. In these and other embodiments, a state in which an interactive element may be interactive as determined based on the coding nomenclature or listed attributes of the interactive element, the interactive element may be referred to as a machine interactive element. The interaction module 140 may be configured to determine if the interactive element may be interacted with by a user for the given state such that the interactive element qualifies as a user interactive element for the given state.

The interaction module 140 may receive the machine interactive elements for the given state and may determine which of the machine interactive elements are user interactive elements for the given state. In some embodiments, the interaction module 140 may determine which of the machine interactive elements are user interactive elements using concrete execution of the software under test 102. In these and other embodiments, the interaction module 140 may inject code into the software under test 102 and concretely run the software under test 102 to obtain information about the software under test 102. Using the obtained information, the interaction module 140 may determine the user interactive elements.

In these and other embodiments, the interaction module 140 may determine the user interactive elements for a given state based on the user interactive elements being in a topmost presentation position in the given state. A topmost presentation position in a given state may indicate that at least a portion of the interactive element is presented to a user in the given state and not completely covered or obscured by another element, display, page, or other presentation. An example of the functionality of the interaction module 140 is provided with respect to FIG. 2 and the obscuring of an interactive element is further illustrated in FIG. 3*b*. The interaction module 140 may indicate which of the machine interactive elements for a given state are user interactive elements.

After receiving an indication of the user interactive elements for a given state, the sequence module 130 may construct event sequences for the user interactive elements and may ignore the machine interactive elements that are not user interactive elements. The sequence module 130 may provide the user interactive event sequences to the state management module 150. For example, following the previous example with events A, B, and C to reach the given state and the three different events, D, E, and F that may occur based on interactive elements D*, E*, and F* in the given state. If the sequence module 130 receives an indication that elements D* and F* are user interactive but the element E* is not user interactive, the sequence module 130 may generate event sequences that are based on events D and F from user interactive elements D* and F*, but not based on event E because element E* is not a user interactive element in the given state. Thus, the sequence module 130 may construct user interactive event sequences of A, B, C, and D and A, B, C, and F. Without the interaction module 140, the sequence module 130 may create three event sequences: A, B, C, and D; A, B, C, and E; and A, B, C, and F. Note that in another state, the element E* may be determined to be a user interactive element and thus event E would be part of the user interactive event sequences generated by the sequence module 130 in the other state.

The state management module 150 may be configured to manage a current state for testing by the symbolic execution module 160. In these and other embodiments, the state management module 150 may receive the user interactive event sequences from the sequence module 130 and may provide the user interactive event sequences for testing to the symbolic execution module 160. The state management module 150 may also receive indications of new states from the symbolic execution module 160. Based on the new states, the state management module 150 may request the sequence module 130 for user interactive event sequences for each state.

The symbolic execution module 160 may be configured to symbolically execute the software under test 102 using the event sequences provided by the state management module 150. In these and other embodiments, the symbolic execution module 160 may substitute variables in the software under test 102 for symbolic variables and execute the software under test 102 using the symbolic variables. Execution of the code using symbolic variables may result in symbolic equations. The symbolic execution module 160 may also be configured to solve the symbolic equations. When a symbolic equation may be solved, it may indicate that an event sequence is coded such that it may be executed given concrete inputs. Furthermore, solving of the symbolic equations may allow for test cases to be generated with inputs that may concretely execute a given event sequence for further testing of the software under test 102. When a symbolic equation may not be solved, it may indicate that an event sequence is coded such that it may not execute with given concrete inputs. In these and other embodiments, an event sequence may not execute based on a logical flaw in the software under test 102 or some other error in the software under test 102. In some embodiments, the symbolic execution module 160 may further be configured to provide new state information to the state management module 150.

In some embodiments, the symbolic execution module 160 may provide further information regarding the symbolic execution of the software under test 102. For example, the information may relate to a number of event sequences to be solved, a number of unsolvable event sequences, among other information. In some embodiments, the information about the testing of the software under test 102 as well as the test cases may be output by the test system 110 as test results 170. In some embodiments, the symbolic execution module 160 and/or the test system 110 may be configured to perform other testing of the software under test 102. In these and other embodiments, the event sequences tested by the test system 110 may be constructed with events resulting from user interactive elements. For example, the event sequences may be constructed using only events that result from user interactive elements and not all interactive elements identified in the software under test 102. By reducing the number of events in an event sequence or a number of event sequences, the test system 110 may reduce the processing time and/or processing resources to test the software under test 102.

Modifications, additions, or omissions may be made to the system 100 without departing from the scope of the present disclosure. For example, the test system 110 may be configured in multiple different configurations. For example, one or more of the modules in the test system 110 may be combined with other of the modules or broken into additional modules. In some embodiments, the modules may be a group of instructions configured to be executed by a processor. In these and other embodiments, the instructions may be grouped in different groupings or configurations. Alternately or additionally, additional instructions may be added to or removed from the test system 110. Furthermore, the test system 110 may be configured to perform other types of testing besides the symbolic testing of the software under test 102. In these and other embodiments, the user interactive elements may be identified from all interactive elements to reduce the processing time and/or processing resources to test the software under test 102.

Figure 2:
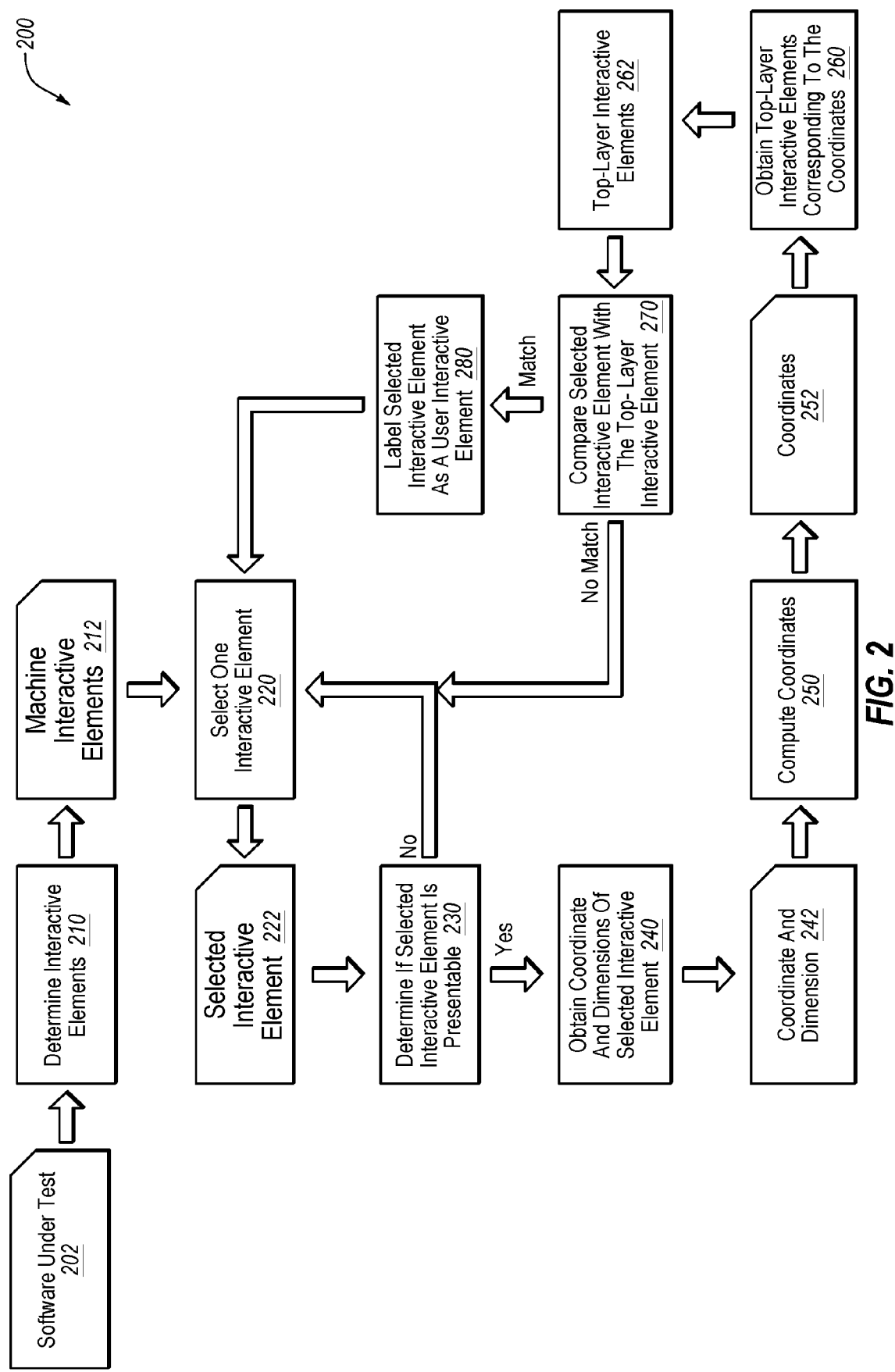
FIG. 2 is a diagram of an example flow that may be used with respect to testing event-driven software applications.

FIG. 2 is a diagram of an example flow 200 that may be used with respect to testing event-driven software applications, according to at least one embodiment described herein. In some embodiments, the flow 200 may be configured to illustrate one embodiment to determine whether interactive elements are user interactive elements in software under test 202. In particular, the flow 200 may be configured to determine whether interactive elements are user interactive elements in a first state of the software under test 202. In these and other embodiments, a portion of the flow 200 may be an example of the operation of the interaction module 140 in the test system 110 of FIG. 1.

The flow 200 may begin at block 210, where interactive elements in the software under test 202 may be determined. The interactive elements in the software under test 202 may be determined based on a static or active analysis of the software under test 202. In some embodiments, the interactive elements may be determined based on the coding nomenclature of the interactive elements. For example, the interactive elements may be functions or may call functions that include instructions, such as commands in a selected coding language, regarding presenting an element on a display. For example, it may be determined if an element includes a cascading style sheet element of "display" or "visibility," when the software under test 202 is a document markup language, to determine that the element is an interactive element.

Alternately or additionally, the interactive elements may include instructions, such as commands in a selected coding language, regarding receiving a user input from an input/output device, such as a touch screen, a mouse, a keyboard, or some other input/output device. In some embodiments, other coding nomenclature, such as coding commands, functions, or other code segments may indicate that an element is an interactive element. The determined interactive elements may be machine interactive elements 212.

In block 220, one of the machine interactive elements 212 may be selected as a selected interactive element 222. In block 230, it may be determined if the selected interactive elements 222 is presentable to a user in a display. To determine if the selected interactive element 222 is presentable, the software under test 202 may be concretely executed using an execution machine. For example, if the software under test 202 is a document markup language, such as HTML and/or JavaScript, a web browser, web browser driver, or analogous software may be used to concretely execute the software under test 202 to determine if the selected interactive element 222 is presentable to a user in a display by the web browser. For example, in some embodiments, test code may be executed using software such as Selenium to determine if the selected interactive element 222 is presentable to a user. As another example, test code may be executed using software such as Selendroid to determine if the selected interactive element 222 is presentable to a user.

If the software under test 202 is configured such that the selected interactive element 222 is not presentable to a user in a display, the flow 200 may proceed to block 220. Upon returning to block 220, another one of the machine interactive elements 212 may be selected as the selected interactive element 222. If there are no more machine interactive elements 212 that have not been selected as the selected interactive element 222 then the flow 200 may end. If the software under test 202 is configured such that the selected interactive element 222 is presentable to a user in a display, the flow 200 may proceed to block 240.

In block 240, a coordinate and dimension 242 of the selected interactive element 222 may be obtained. In this and other embodiments, the coordinate and dimension 242 of the selected interactive element 222 may refer to a coordinate and dimension of the selected interactive element 222 when the selected interactive element 222 is presented to a user on a display. In these and other embodiments, the coordinate may be a corner of the selected interactive element 222 and the dimensions may be size and configuration of the perimeter of the selected interactive element 222. For example, the selected interactive element 222 may have a rectangular shape when presented to a user. In these and other embodiments, the coordinate of the selected interactive element 222 may be a pixel location on the display of a right-upper hand corner of the selected interactive element 222 or some other location of the selected interactive element 222. The dimensions of the selected interactive element 222 may include the length in pixels of the four sides of the selected interactive element 222. In some embodiments, the coordinate and dimension 242 may be obtained by a code segment injected into the software under test 202. In these and other embodiments, the code segment may include instructions for executing the code to provide the coordinate and dimension 242 when the software under test 202 is concretely executed. Alternately or additionally, the coordinate and dimension 242 may be obtained by statically analyzing the selected interactive element 222 to obtain a code definition that may include the coordinate and dimension 242 of the selected interactive element 222.

Figure 3B:
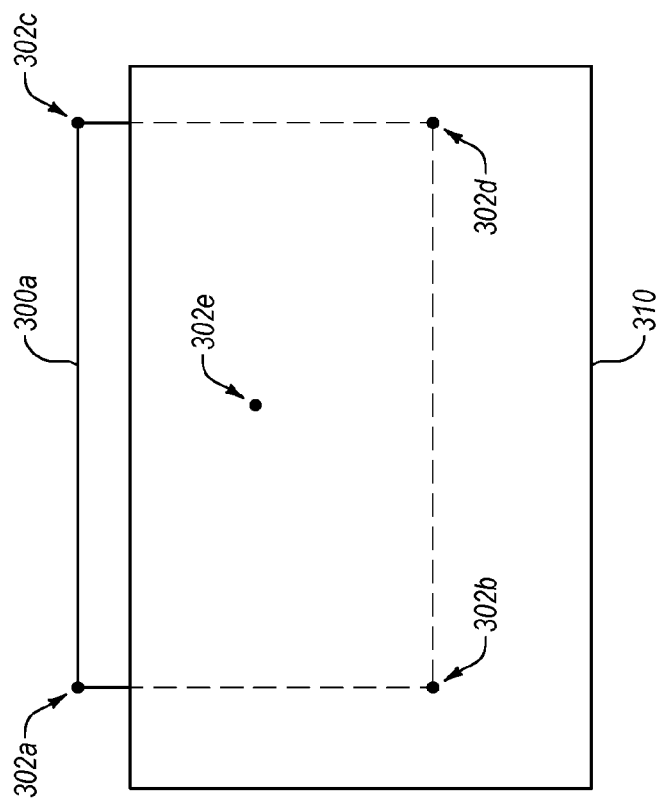
FIG. 3b illustrates an overlay of example interactive elements.
Figure 3A:
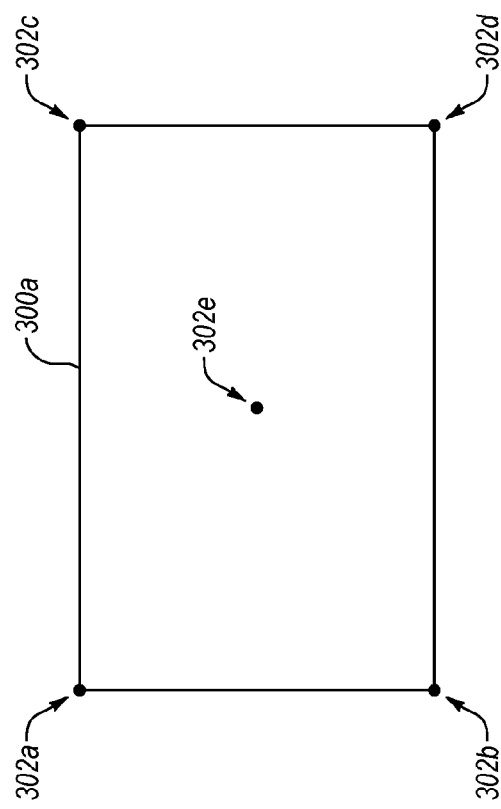
FIG. 3a illustrates an example interactive element.

FIG. 3a illustrates an example interactive element 300a, according to at least one embodiment described herein. The interactive element 300a may include a first coordinate 302a, a second coordinate 302b, a third coordinate 302c, a fourth coordinate 302d, and a fifth coordinate 302e, referred to collectively as coordinates 302. As illustrated, the first coordinate 302a may be the coordinate and the dimensions may be the length of the four sides of the interactive element 300a.

Returning to FIG. 2, in block 250, multiple coordinates 252 of the selected interactive element 222 may be computed using the coordinate and dimension 242. In some embodiments, the coordinates 252 may be vertices of the selected interactive element 222. For example, a pixel location of the four corners of a rectangle may be the coordinates 252 when the selected interactive element 222 has a rectangular shape. Alternately or additionally, the coordinates 252 may include additional coordinates covered by the selected interactive element 222 when presented to a user. For example, the coordinates 252 may include the vertices of the selected interactive element 222 and one or more coordinates in the interior of the selected interactive element 222. The one or more coordinates in the interior of the selected interactive element 222 may include a middle of the selected interactive element 222 or some other interior coordinate of the selected interactive element 222.

For example, as illustrated in FIG. 3a, the vertices of the interactive element 300a may be the first coordinate 302a, the second coordinate 302b, the third coordinate 302c, and the fourth coordinate 302d. In these and other embodiments, the coordinates 252 computed in block 250 of FIG. 2 may be one or more of the coordinates 302. In some embodiments, the coordinates 252 computed in block 250 of FIG. 2 may include the fifth coordinate 302e in the interior of the interactive element 300a.

Returning to FIG. 2, in block 260, top-layer interactive elements 262 that correspond to the coordinates 252 may be obtained. In these and other embodiments, the top-layer interactive elements 262 may be the top-layer interactive elements for the given state of the software under test 202. The top-layer interactive elements 262 may be elements that are being presented to a user and that are not obscured or covered by another interactive element such that they are on a top-layer, assuming a stacking of interactive elements where the top-layer is presentable to a user. The top-layer interactive elements 262 corresponding to the coordinates 252 may be the top-layer interactive elements for the given state that include the coordinates 252.

In some embodiments, an interactive element may be obtained for each coordinate 252, such that there are a same number of the top-layer interactive elements 262 as coordinates 252. In these and other embodiments, however, one or more, and in some embodiments, all of the top-layer interactive elements 262 may be the same interactive element. For example, if a first top-layer interactive element covers all of the coordinates 252, then the top-layer interactive elements 262 may include only the first top-layer interactive element that corresponding to each of the coordinates 252. Alternately, a different top-layer interactive element may correspond to each of the coordinates 252 such that the top-layer interactive elements 262 include a number of different interactive elements equal to the number of coordinates 252.

In some embodiments, the top-layer interactive elements 262 may be obtained by a code segment injected into the software under test 202. In these and other embodiments, the code segment may include instructions for software executing the code to provide the top-layer interactive elements 262 for each of the coordinates 252 when the software under test 202 is concretely executed. For example, if the software under test 202 is an HTML or JavaScript, a function such as document.elementFromPoint( ) in JavaScript may be injected into the code to obtain the top-layer interactive elements 262 for the coordinates 252.

Alternately or additionally, the top-layer interactive elements 262 may be obtained by statically analyzing the coordinates 252 to obtain a code definition that may include the coordinate and dimension 242 of the selected interactive element 222.

For example, FIG. 3b illustrates an overlay of example interactive elements, according to at least one embodiment described herein. For example, FIG. 3b illustrates an overlay element 310 that is overlaying the interactive element 300a. As illustrated in FIG. 3b, both the overlay element 310 and the interactive element 300a are being presented to a user. However, the overlay element 310 is overlaying a portion of the interactive element 300a. Thus, for coordinates included in the overlay element 310, the overlay element 310 may be considered the top-layer interactive element as no other interactive element is covering a portion of the overlay element 310. Thus, for the second coordinate 302b, the fourth coordinate 302d, and the fifth coordinate 302e, the overlay element 310 may be considered the top-layer interactive element. In contrast, for the first coordinate 302a and the second coordinate 302b, the interactive element 300a may be considered the top-layer interactive element.

For the example illustrated in FIG. 3b, in the flow 200 of FIG. 2, assuming the coordinates 302 correspond to the coordinates 252, the top-layer interactive elements 262 returned for the five coordinates 302 would be the interactive element 300a and the overlay element 310. In these and other embodiments, the interactive element 300a would correspond to the first coordinate 302a and third coordinate 302c and the overlay element 310 would correspond to the second coordinate 302b, fourth coordinate 302d, and fifth coordinate 302e.

Returning to FIG. 2, in block 270, the selected interactive element 222 is compared with the top-layer interactive elements 262. When the selected interactive element 222 matches one of the top-layer interactive elements 262, the selected interactive element 222 is a top-layer interactive element that may be a user interactive element. In these and other embodiments, the flow 200 may continue to block 280. When the selected interactive element 222 does not match one of the top-layer interactive elements 262, the selected interactive element 222 is not a top-layer interactive element. As a result, the selected interactive element 222 may not be interacted with by a user at any one of the coordinates 252 and may be determined to not be a user interactive element. In these and other embodiments, the flow 200 may continue to block 220. In block 280, the selected interactive element 222 may be labeled as a user interactive element. The flow 200 may continue to block 220.

Upon returning to block 220, another one of the machine interactive elements 212 may be selected as the selected interactive element 222. If there are no more machine interactive elements 212 to be selected as the selected interactive element 222 then the flow 200 may end. At the end of the flow 200, a subset of the machine interactive elements 212 may have been labeled user interactive elements. In some embodiments, the interactive elements labeled as user interactive elements may be used for testing of the software under test 202 as described with respect to FIG. 1. Alternately or additionally, the interactive elements labeled as user interactive elements may be used for any other purpose.

Modifications, additions, or omissions may be made to the flow 200 without departing from the scope of the present disclosure. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, block 230 may be omitted from the flow 200. Alternately or additionally blocks 240 through 270 may be omitted from the flow 200.

Figure 4:
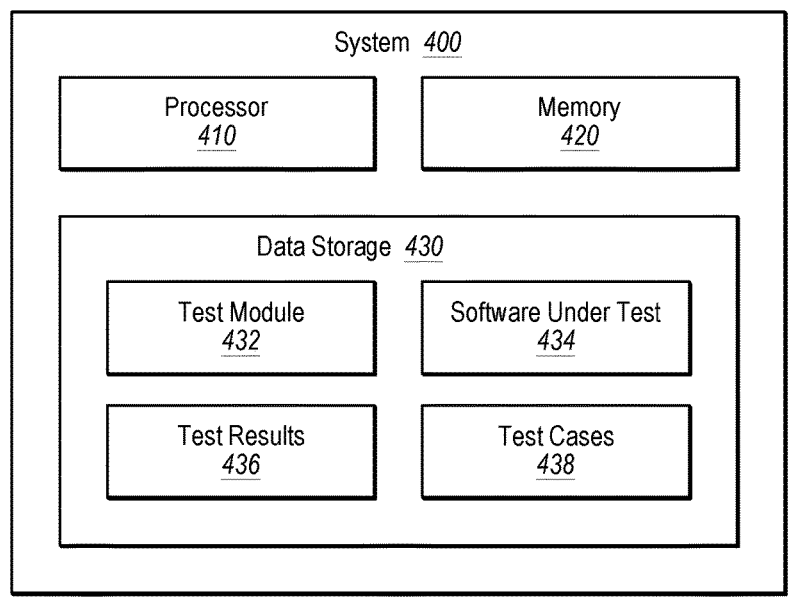
FIG. 4 illustrates an example device that may test event-driven software applications.

FIG. 4 illustrates an example system 400, according to at least one embodiment described herein. The system 400 may include any suitable system, apparatus, or device configured to test software. The system 400 may include a processor 410, a memory 420, and a data storage 430, which all may be communicatively coupled. The data storage 430 may include various types of data, such as a test module 432, software under test 434, test results 436, and test cases 438.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described herein. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform the flow 200 and/or the methods 500 and 600 of FIGS. 2, 5, 6a, and 6b, respectively. For example, the processor 410 may load the test module 432 into the memory 420 and execute instructions within the test module 432 to test the software under test 434. Executing the instructions may result in the execution of operations analogous to those discussed with respect to the test system 110 the flow 200 and/or the methods 500 and 600 of FIGS. 1, 2, 5, 6a, and 6b, respectively. In these and other embodiments, executing the test module 432 to test the software under test 434 may result in the generation of the test results 436 and the test cases 438.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

Modifications, additions, or omissions may be made to the system 400 without departing from the scope of the present disclosure. For example, the data storage 430 may be multiple different storage mediums located in multiple locations and accessed by the processor 410 through a network.

Figure 5:
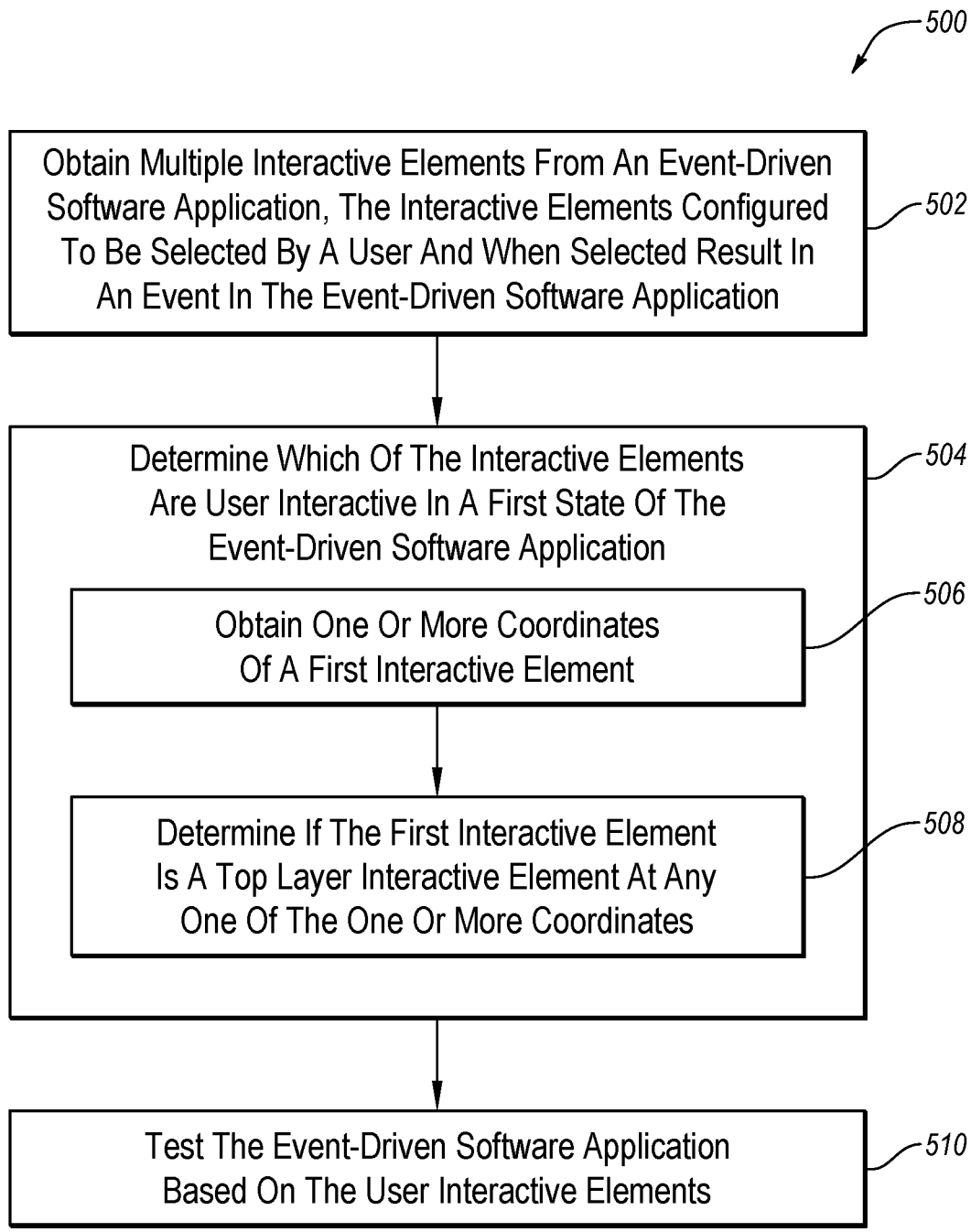
FIG. 5 is a flowchart of an example method of software testing.

FIG. 5 is a flowchart of an example method 500 of software testing, according to at least one embodiment described herein. In some embodiments, one or more of the operations associated with the method 500 may be performed by the test system 110. Alternately or additionally, the method 500 may be performed by any suitable system, apparatus, or device. For example, the processor 410 of the system 400 of FIG. 4 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

The method 500 may begin at block 502 where multiple interactive elements from an event-driven software application may be obtained. The interactive elements may be configured to be selected by a user and when selected result in an event in the event-driven software application. At block 504, it may be determined which of the interactive elements are user interactive in a first state of the event-driven software application.

At block 506, one or more coordinates of a first interactive element may be obtained. In some embodiments, multiple coordinates may be obtained, including corner coordinates and a mid-coordinate of the first interactive element.

At block 508, it may be determined if the first interactive element is a top layer interactive element at any one of the one or more coordinates. In some embodiments, the first interactive element may be determined to be user interactive in the first state when the first interactive element is the top layer interactive element at one of the one or more coordinates.

In some embodiments, determining which of the interactive elements are user interactive may further include determining whether the first interactive element is displayable in a user interface. In these and other embodiments, in response to the first interactive element being displayable then the one or more coordinates may be obtained and it may be determined if the first interactive element is a top layer interactive element.

In some embodiments, determining which of the interactive elements are user interactive may further include obtaining the interactive elements for the first state of the event-driven software application and selecting one of the interactive elements. In these and other embodiments, the selecting one of the interactive elements, the obtaining one or more coordinates, and the determining if the selected interactive element is a top layer interactive element may be repeated for each of the interactive elements for the first state to determine which of the interactive elements for the first state of the event-driven software application are user interactive.

At block 510, the event-driven software application may be tested based on the user interactive elements.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include determining which of the interactive elements are user interactive in a second state of the event-driven software application. The second state may be obtained in the event-driven software application through selection of an interactive element in the first state. The method 500 may further include constructing an event sequence for the second state using the interactive elements that are user interactive. In these and other embodiments, the event-driven software application may be tested based on the event sequence.

In some embodiments, it may be determined whether the first interactive element is user interactive in the first state and the second state of the event-driven software application.

Figure 6A:
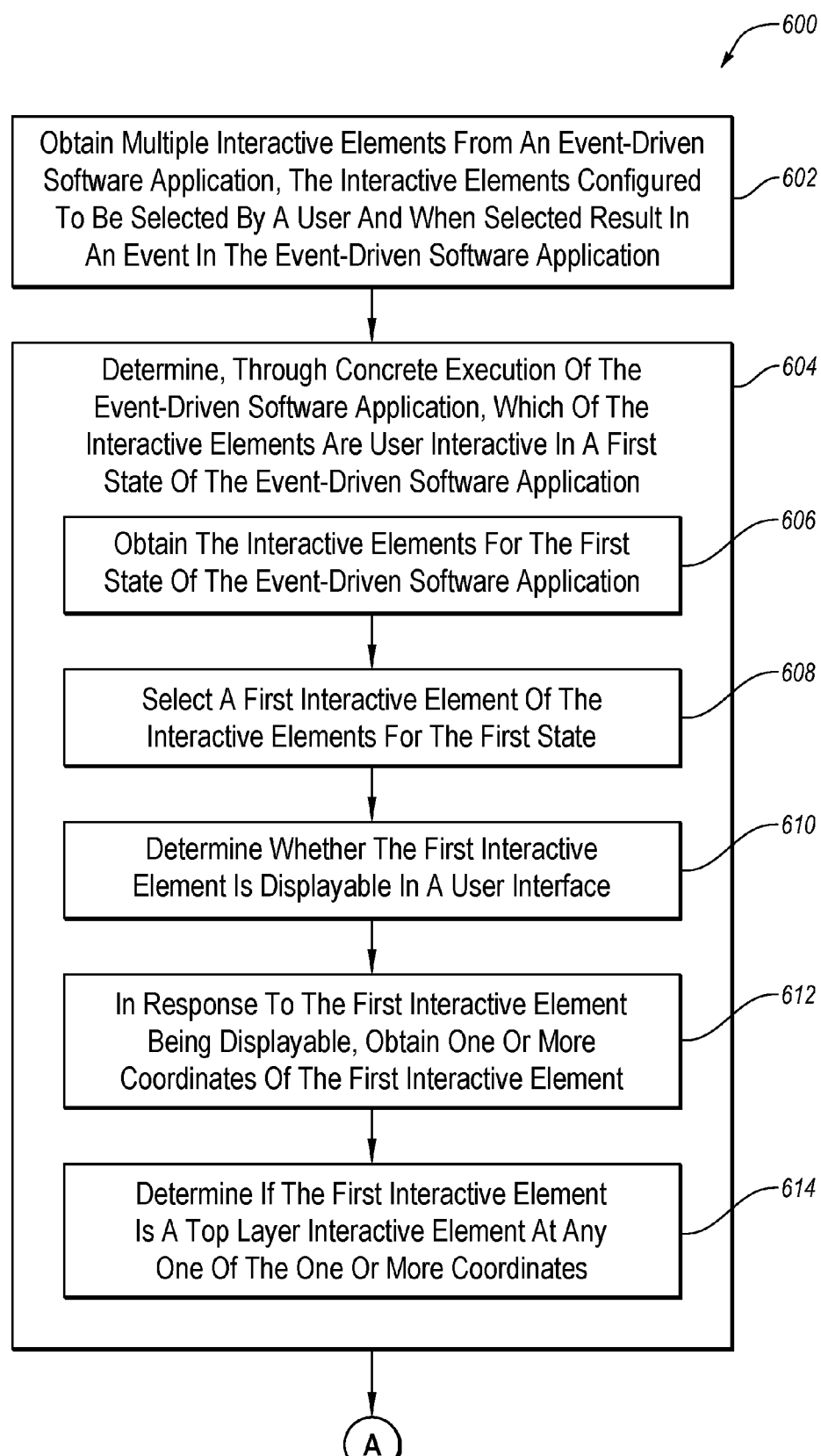
FIGS. 6a and 6b illustrate a flowchart of another example method of software testing.
Figure 6B:
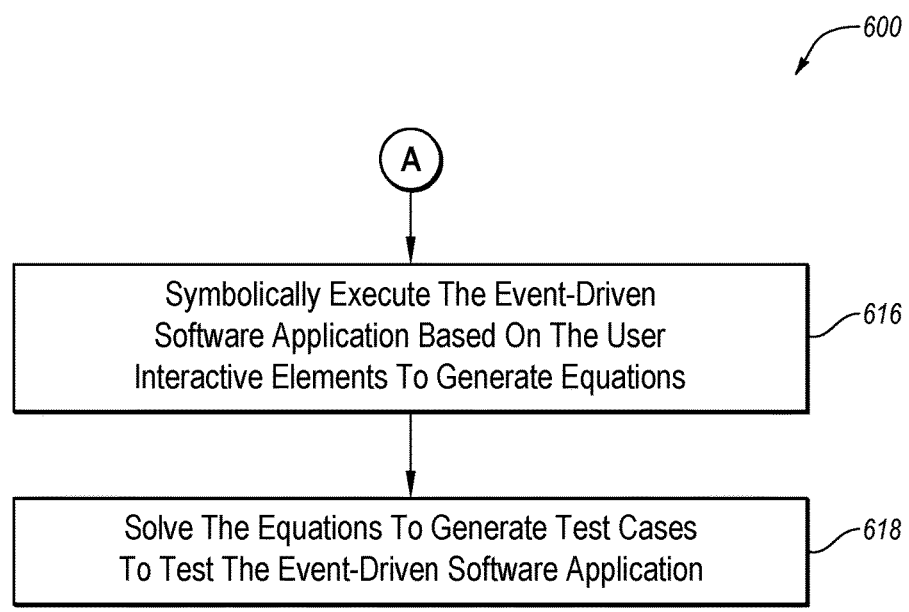

FIGS. 6a and 6b illustrate a flowchart of another example method 600 of software testing, according to at least one embodiment described herein. In some embodiments, one or more of the operations associated with the method 600 may be performed by the test system 110. Alternately or additionally, the method 600 may be performed by any suitable system, apparatus, or device. For example, the processor 410 of the system 400 of FIG. 4 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

The method 600 may begin at block 602 where multiple interactive elements from an event-driven software application may be obtained. The interactive elements may be configured to be selected by a user and when selected result in an event in the event-driven software application.

At block 604, it may be determined, through concrete execution of the event-driven software application, which of the interactive elements are user interactive in a first state of the event-driven software application.

At block 606, the interactive elements for the first state of the event-driven software application may be obtained. At block 608, a first interactive element of the interactive elements for the first state may be selected. At block 610, it may be determined whether the first interactive element is displayable in a user interface.

At block 612, in response to the first interactive element being displayable, one or more coordinates of the first interactive element may be obtained. In some embodiments, multiple coordinates may be obtained, including corner coordinates and a mid-coordinate of the first interactive element.

At block 614, it may be determined if the first interactive element is a top layer interactive element at any one of the one or more coordinates. In some embodiments, the first interactive element may be determined to be user interactive in the first state when the first interactive element is the top layer interactive element at one of the one or more coordinates.

In some embodiments, determining which of the interactive elements are user interactive in a first state may further include selecting a second interactive element of the interactive elements for the first state and determining whether the second interactive element is displayable in a user interface. In some embodiments, in response to the second interactive element being displayable, the method 600 may include obtaining one or more coordinates of the second interactive element and determining if the second interactive element is a top layer interactive element at any one of the one or more coordinates of the second interactive element.

At block 616, the event-driven software application may be symbolically executed based on the user interactive elements to generate equations. At block 618, the equations to generate test cases to test the event-driven software application may be solved.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600 may further include determining which of the interactive elements are user interactive in a second state of the event-driven software application. The second state may be obtained in the event-driven software application through selection of an interactive element in the first state. The method 600 may further include constructing an event sequence for the second state using the interactive elements that are user interactive. In these and other embodiments, the event-driven software application may be symbolically executed based on the event sequence to generate the equations. In some embodiments, it may be determined whether the first interactive element is user interactive in the first state and the second state of the event-driven software application.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 420 or data storage 430 of FIG. 4) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer implemented method of software testing, the method comprising:
    obtaining a plurality of interactive elements from an event-driven software application, the interactive elements configured to be selected by a user and when selected result in an event in the event-driven software application;
    determining which of the interactive elements are user interactive in a first state of the event-driven software application, wherein the determining includes:
    selecting an interactive element;
    determining, via concrete execution of the event-driven software application, if the interactive element is presentable to the user;
    obtaining, via the concrete execution, a coordinate and a dimension of the interactive element;
    computing one or more other coordinates of the interactive element based on the coordinate and the dimension of the interactive element; and
    determining, via the concrete execution, if the interactive element is an uncovered top layer interactive element at at least one of the coordinate and any one of the one or more other coordinates;
    symbolically executing the event-driven software application based on one or more determined user interactive elements to generate one or more equations;
    solving the one or more equations to generate one or more test cases; and
    testing the event-driven software application via the one or more test cases.

2. The computer implemented method of claim 1, wherein the interactive element is determined to be user interactive in the first state when the interactive element is the top layer interactive element at at least one of the coordinate and one of the one or more other coordinates.

3. The computer implemented method of claim 1, wherein determining which of the interactive elements are user interactive further includes determining whether the interactive element is displayable in a user interface, wherein in response to the interactive element being displayable performing the computing the one or more other coordinates and the determining if the interactive element is a top layer interactive element.

4. The computer implemented method of claim 1, wherein a plurality of coordinates are computed including corner coordinates and a mid-coordinate of the interactive element.

5. The computer implemented method of claim 1, wherein the determining which of the interactive elements are user interactive further includes:
    obtaining the interactive elements for the first state of the event-driven software application;
    selecting one of the interactive elements, wherein the selected interactive element is a first interactive element; and
    repeating the selecting one of the interactive elements, the obtaining the coordinate and the dimension, the computing the one or more other coordinates, and the determining if the selected interactive element is a top layer interactive element for each of the interactive elements for the first state to determine which of the interactive elements for the first state of the event-driven software application are user interactive.

6. The computer implemented method of claim 1, further comprising:
    determining which of the interactive elements are user interactive in a second state of the event-driven software application, the second state obtained in the event-driven software application through selection of the interactive element in the first state; and
    constructing an event sequence for the second state using the interactive elements that are user interactive, wherein the event-driven software application is tested based on the event sequence.

7. The computer implemented method of claim 6, wherein it is determined whether the interactive element is user interactive in the first state and the second state of the event-driven software application.

8. A non-transitory computer-readable storage media including computer-executable instructions configured to cause a system to perform operations to test software, the operations comprising:
    obtain a plurality of interactive elements from an event-driven software application, the interactive elements configured to be selected by a user and when selected result in an event in the event-driven software application;
    determine which of the interactive elements are user interactive in a first state of the event-driven software application, wherein the determination of which of the interactive elements are user interactive includes:
    select an interactive element;
    determine, via concrete execution of the event-driven software application, if the interactive element is presentable to the user;
    obtain, via the concrete execution, a coordinate and a dimension of the interactive element;
    compute one or more other coordinates of the interactive element based on the coordinate and the dimension of the interactive element; and
    determine, via the concrete execution, if the interactive element is an uncovered top layer interactive element at at least one of the coordinate and any one of the one or more other coordinates;
symbolically execute the event-driven software application based on one or more determined user interactive elements to generate one or more equations;
solve the one or more equations to generate one or more test cases; and
test the event-driven software application via the one or more test cases.

9. The non-transitory computer-readable storage media of claim 8, wherein the interactive element is determined to be user interactive in the first state when the interactive element is the top layer interactive element at at least one of the coordinate and one of the one or more other coordinates.

10. The non-transitory computer-readable storage media of claim 8, wherein the determination of which of the interactive elements are user interactive includes operations including determining whether the interactive element is displayable in a user interface, wherein in response to the interactive element being displayable performing the obtaining, the computing, and the determining.

11. The non-transitory computer-readable storage media of claim 8, wherein a plurality of coordinates are computed, including corner coordinates and a mid-coordinate of the interactive element.

12. The non-transitory computer-readable storage media of claim 8, wherein the determination of which of the interactive elements are user interactive further includes:
obtain the interactive elements for the first state of the event-driven software application;
select a first interactive element, wherein the selected first interactive element is the interactive element; and
repeat the select one of the interactive elements, the obtain the coordinate and the dimension, the compute one or more other coordinates, and the determine if the interactive element is a top layer interactive element for each of the interactive elements for the first state to determine which of the interactive elements for the first state of the event-driven software application are user interactive.

13. The non-transitory computer-readable storage media of claim 8, wherein the operations further include:
determine which of the interactive elements are user interactive in a second state of the event-driven software application, the second state obtained in the event-driven software application through selection of an interactive element in the first state; and
construct an event sequence for the second state using the interactive elements that are user interactive, wherein the event-driven software application is tested based on the event sequence.

14. The non-transitory computer-readable storage media of claim 13, wherein it is determined whether the interactive element is user interactive in the first state and the second state of the event-driven software application.

15. A computer implemented method of software testing, the method comprising:
obtaining a plurality of interactive elements from an event-driven software application, the interactive elements configured to be selected by a user and when selected result in an event in the event-driven software application;
determining, through concrete execution of the event-driven software application, which of the interactive elements are user interactive in a first state of the event-driven software application, wherein the determining includes:
obtaining the interactive elements for the first state of the event-driven software application;
selecting a first interactive element of the interactive elements for the first state;
determining, via concrete execution of the event-driven software application, whether the first interactive element is displayable in a user interface;
in response to the first interactive element being displayable, obtaining, via the concrete execution, a coordinate and a dimension of the first interactive element;
computing one or more other coordinates of the first interactive element based on the coordinate and the dimension of the first interactive element; and
determining, via the concrete execution, if the first interactive element is an uncovered top layer interactive element at at least one of the coordinate and any one of the one or more other coordinates;
symbolically executing the event-driven software application based on the user interactive elements to generate equations;
solving the equations to generate test cases to test the event-driven software application; and
testing the event-driven software application via the test cases.

16. The computer implemented method of claim 15, wherein a plurality of coordinates are computed, including corner coordinates and a mid-coordinate of the interactive element.

17. The computer implemented method of claim 15, wherein the interactive element is determined to be user interactive in the first state when the interactive element is the top layer interactive element at at least one of the coordinate and one of the one or more other coordinates.

18. The computer implemented method of claim 15, wherein determining which of the interactive elements are user interactive in a first state further includes:
selecting a second interactive element of the interactive elements for the first state;
determining whether the second interactive element is displayable in a user interface;
in response to the second interactive element being displayable, obtaining one or more coordinates of the second interactive element; and
determining if the second interactive element is a top layer interactive element at any one of the one or more coordinates of the second interactive element.

19. The computer implemented method of claim 15, further comprising:
determining which of the interactive elements are user interactive in a second state of the event-driven software application, the second state obtained in the event-driven software application through selection of an interactive element in the first state; and
constructing an event sequence for the second state using the interactive elements that are user interactive, wherein the event-driven software application is symbolically executed based on the event sequence to generate the equations.

20. The computer implemented method of claim 19, wherein it is determined whether the interactive element is user interactive in the first state and the second state of the event-driven software application.

* * * * *